United States Patent
Nealon et al.

(10) Patent No.: US 7,195,056 B2
(45) Date of Patent: Mar. 27, 2007

(54) THERMAL CONTROL COVERS

(75) Inventors: Joseph M. Nealon, Woodland Hills, CA (US); Stephen J. Schultz, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 157 days.

(21) Appl. No.: 10/881,275

(22) Filed: Jun. 29, 2004

(65) Prior Publication Data

US 2005/0284605 A1    Dec. 29, 2005

(51) Int. Cl.
F28F 7/02    (2006.01)

(52) U.S. Cl. ........................................ 165/80.1; 165/46

(58) Field of Classification Search ...... 165/80.1–80.5, 165/185, 46, 47; 361/704, 688
See application file for complete search history.

(56) References Cited

U.S. PATENT DOCUMENTS

| | | | | |
|---|---|---|---|---|
| 2,629,988 A | * | 3/1953 | Lee ............................ | 165/72 |
| 2,778,609 A | * | 1/1957 | Peeps .......................... | 165/164 |
| 3,151,633 A | * | 10/1964 | Shuman ...................... | 138/177 |
| 3,743,012 A | * | 7/1973 | Laxo ........................... | 165/101 |
| 3,815,573 A | * | 6/1974 | Marcus ........................ | 126/204 |
| 3,973,585 A | * | 8/1976 | Henderson ................... | 137/340 |
| 4,279,270 A | * | 7/1981 | Francis, Jr. ................. | 137/340 |
| 4,823,482 A | * | 4/1989 | Lakic ........................... | 36/2.6 |
| 4,914,752 A | * | 4/1990 | Hinson et al. ................ | 2/458 |
| 5,363,907 A | * | 11/1994 | Dunning et al. .............. | 165/46 |
| 5,377,495 A | * | 1/1995 | Daigle .......................... | 62/125 |
| 6,352,550 B1 | * | 3/2002 | Gildersleeve et al. ....... | 607/108 |

* cited by examiner

*Primary Examiner*—Tresa J. Walberg
(74) *Attorney, Agent, or Firm*—Robert R. Richardson, P.S.

(57) ABSTRACT

A heat transfer cover mitigates temperature changes of an object. A cover body is configured to receive the object. A plurality of heat transfer channels are defined in an interior of the cover body. The channels are arranged to transport a heat transfer fluid in thermal communication with the object. An inlet port is configured to connect the plurality of channels with a source of the heat transfer fluid. An interior surface of the cover body may substantially conform to a shape of an exterior of the object. A plurality of lands may be defined in the interior of the cover body. The lands are arranged to engage the exterior of the object. The heat transfer channels may be defined between adjacent lands. At least a first end of the cover body may define an opening. The at least first end and the object are substantially sealed at the opening.

31 Claims, 3 Drawing Sheets

THERMAL CONTROL COVERS

FIELD OF THE INVENTION

This invention relates generally to environmental testing and, more specifically, to pressure testing.

BACKGROUND OF THE INVENTION

Acceptance testing of production items often includes environmental testing, such as pressure testing. For example, a pressure vessel or other production item may be pressurized to verify integrity.

Typical current pressure test processes utilize dry nitrogen ($N_2$) gas to pressurize a unit under test. $N_2$ gas is used instead of water in order to maintain internal cleanliness of the unit under test (UUT).

As is known, in a closed gaseous system when pressure increases, temperature also increases. As a result, during a pressurization cycle of pressure testing the $N_2$ gas may heat up to temperatures that exceed engineering design temperature limits of the UUT. As is also known, in a closed gaseous system conversely when pressure decreases, temperature also decreases. As a result, during a depressurization cycle of pressure testing the $N_2$ gas temperature may drop below engineering design temperature limits for the UUT. Such temperature excursions can induce undesirable thermal stresses.

For a pressure vessel, exceeding engineering design temperature limits may causes severe consequences. For example, the temperature excursion may go beyond brittle fracture prevention limits (BFPL) on temperature for a given pressure. In such a case, operational lifetime of the pressure vessel may be shortened (that is, a number of allowed pressurization cycles may be limited). Otherwise, the BFPL may be even more constrained to accommodate the same operational lifetime but to insert an extra design safety margin into the pressure vessel.

As a result, it would be desirable to control temperature excursions during pressure testing. One currently known method for controlling temperature excursions during pressure testing reduces the rates of pressurization and depressurization. However, this currently known method results in lengthy cycle times for the pressure testing process. For example, each pressurization/depressurization cycle of a pressure test may take over an hour. In some pressure test scenarios where five or so pressurization/depressurization cycles are performed, the entire pressure test can take over five hours. In another known method, forced air cooling is applied to the UUT during pressurization. While this technique addresses heating during pressurization, the depressurization cycle must still be slowed as described above.

As a result, it would be desirable to mitigate temperature excursions during pressure testing without inserting excessive delays into the pressure testing process. However, there is an unmet need in the art for a system and method for mitigating temperature changes during pressure testing without inserting excessive delays into the pressure testing process.

SUMMARY OF THE INVENTION

Embodiments of the present invention provide an apparatus and method for mitigating temperature changes of an object. Advantageously, embodiments of the present invention can enable pressure testing to be performed without temperature excursions beyond engineering design temperature limits and without insertion of excessive delays. This can result in reductions in thermal stresses and touch labor, and can help minimize bottlenecks in production lines. Also, according to another embodiment of the present invention, an apparatus for mitigating temperature changes of an object can be fabricated quickly and inexpensively using rapid prototyping manufacturing techniques.

According to an embodiment of the present invention, a heat transfer cover is provided for mitigating temperature changes of an object. The cover includes a cover body configured to receive therein the object. A plurality of heat transfer channels are defined in an interior of the cover body, and the channels are arranged to transport a heat transfer fluid in thermal communication with the object. An inlet port is configured to connect the plurality of channels with a source of the heat transfer fluid.

According to an aspect of the present invention, an interior surface of the cover body substantially conforms to a shape of an exterior of the object received therein. This permits the cover to have a substantially precise fit to the object. A plurality of lands may be defined in the interior of the cover body, and the lands are arranged to engage the exterior of the object. The heat transfer channels may be defined between adjacent lands.

According to another aspect of the present invention, at least a first end of the cover body may define an opening, and the at least first end of the cover body and the object are substantially sealed at the opening. This permits any instrumentation that may be fitted to the object to remain uninfluenced by flow of the heat transfer fluid in the cover body.

According to another embodiment of the present invention, a method is provided for mitigating temperature changes of an object. An object is received in a cover. Temperature of the object is caused to change. A heat transfer fluid in thermal communication with an exterior of the object is flowed through an interior of the cover.

According to another embodiment of the present invention, a method is provided for fabricating a heat transfer cover for mitigating temperature changes in an object. Based on an exterior of the object, a cover for the object is defined in a computer-aided-design file, and an interior of the cover has a plurality of heat transfer channels. A three-dimensional model file is generated from the computer-aided-design file, and a rapid-prototyping procedure is performed to create the cover from the three-dimensional model file.

DETAILED DESCRIPTION OF THE INVENTION

By way of overview, embodiments of the present invention provide an apparatus and method for mitigating temperature changes of an object. Advantageously, embodiments of the present invention can enable pressure testing to be performed without temperature excursions beyond engineering design temperature limits and without insertion of excessive delays. This can result in reductions in touch labor and can help minimize bottlenecks in production lines. Also, according to another embodiment of the present invention, an apparatus for mitigating temperature changes of an object can be fabricated quickly and inexpensively using rapid prototyping manufacturing techniques.

Figure 1:
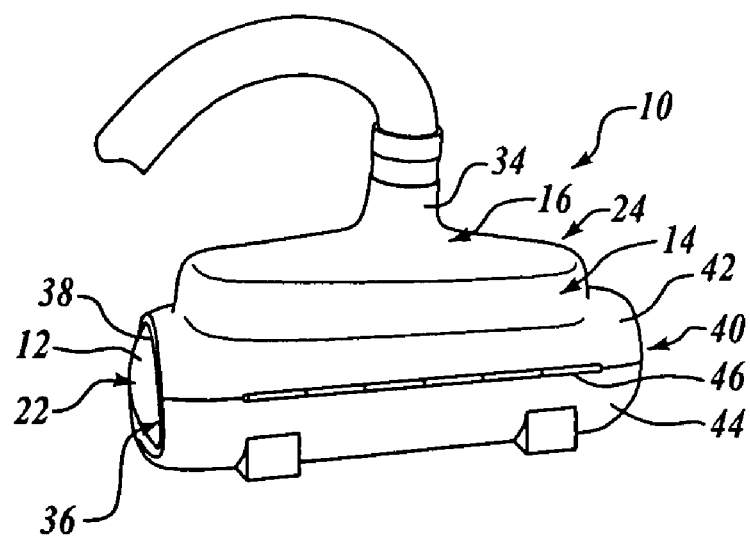
FIG. 1 is a perspective view of a heat transfer cover according to an embodiment of the present invention.
Figure 2:
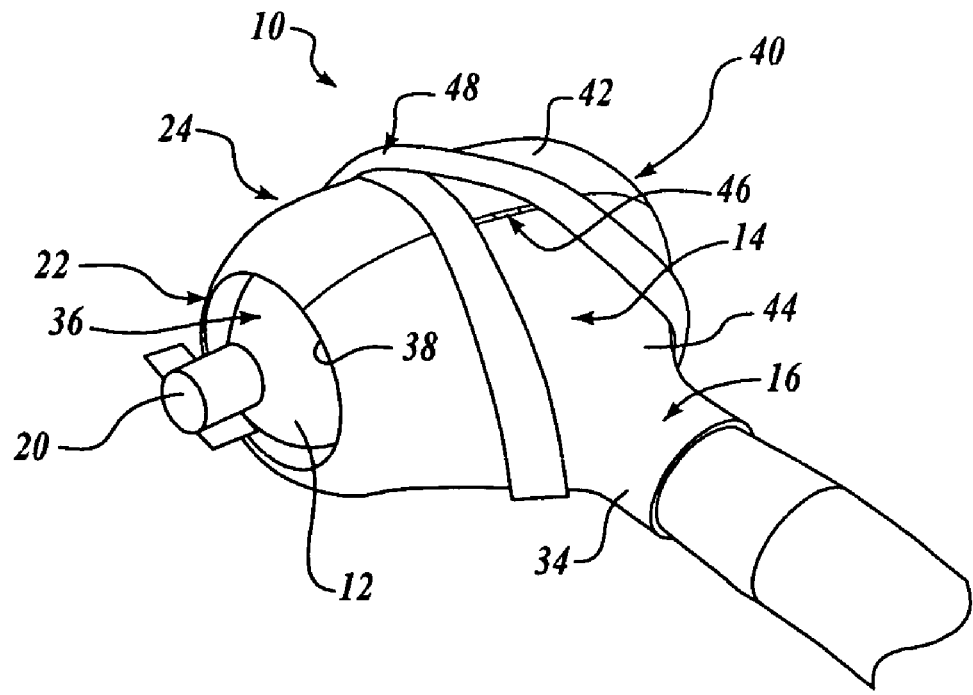
FIG. 2 is another perspective view of a heat transfer cover according to an embodiment of the present invention.

Referring now to FIGS. 1 and 2, a cover 10 is provided for mitigating temperature changes of an object 12. The cover 10 includes a cover body 14 configured to receive therein the object 12. A plurality of heat transfer channels (not shown in FIG. 1) are defined in an interior of the cover body 14, and the channels are arranged to transport a heat transfer fluid in thermal communication with the object 12. An inlet port 16 is configured to connect the plurality of channels with a source of the heat transfer fluid. Details will be set forth below.

The object 12 suitably is any object for which it is desired to mitigate temperature changes therein. It will be appreciated that the object 12 is not necessarily considered to be a component of the present invention but, instead, is a workpiece upon which the invention functions. It is emphasized that any object, item, piece of hardware, or the like may be used as desired for a particular application. Nonetheless, objects that are well suited for having temperature changes mitigated by embodiments of the present invention include without limitation tanks, cylinders, pressure vessels, and the like. As a non-limiting example, these exemplary objects may benefit from temperature change mitigation provided by embodiments of the present invention during pressure testing.

For example, the exemplary object 12 shown in FIG. 1 is a tank undergoing pressure testing. A test rig (not shown) is attached to a fitting 20 at an end 22 of the object. As part of a pressurization/depressurization cycle, a fluid, such as without limitation $N_2$ gas, is introduced into the object through the test rig (not shown) and the fitting 20, thereby raising pressure inside the object 12. As discussed above, this also causes temperature of the $N_2$ gas to increase, thereby causing temperature of the object 12 to increase. Advantageously, embodiments of the present invention mitigate this increase in temperature of the object 12. After completion of pressurization, the object 12 is depressurized as part of the pressurization/depressurization cycle. The N2 gas is bled from the object 12 through the fitting 20 and the test rig (not shown). As also discussed above, this causes temperature of the $N_2$ gas to decrease, thereby causing temperature of the object 12 to decrease. Advantageously, embodiments of the present invention also mitigate this decrease in temperature of the object 12.

It will be appreciated that any object whatsoever may be used and that pressure testing of the above object is given by way of non-limiting example. Embodiments of the present invention advantageously may mitigate temperature changes in any object that is subject to any thermal-controlled process. For example, embodiments of the present invention may be utilized in the assembly of two or more parts that have an interference fit. In this exemplary application, one part is heated in an oven to expand an exterior dimension while the other is chilled in a liquid nitrogen bath or by using a medium such as dry ice to contract the interior dimension. The two parts are assembled together and allowed to return to ambient temperature and to designed dimensions, thereby creating an interference fit. Embodiments of the present invention may be used to assist either of or both of the parts assembled in this manner to return to ambient temperature faster and in a controlled environment. Embodiments of the present invention may also be used to induce the heating or chilling medium or used to maintain the temperature of a part until it is assembled with its mating component. Advantageously, advances in the rapid prototyping process utilizing metals allow a cover to be fabricated that has the ability to withstand the temperature variation associated with an interference fit assembly process.

Embodiments of the present invention also may be used in the brazing of parts or assemblies. Many braze joints are created by inserting the part into an oven. The oven braze process does not heat assemblies or joints in an even manner and produces variation in the quality of the braze joint or induces flaws in the joint. Advantageously, an embodiment of the present invention may be fabricated to conform to a braze joint in order to induce a heating medium in a more precise location and manner, thereby producing a higher quality braze joint.

Utilizing the invention for both the interference assembly and brazing processes may enable a reduction of cycle times because any component may be heated or cooled in a localized area versus heating or chilling the entire component. This reduction of cycle time would be especially advantageous in large and complex assemblies that may be placed in an oven or liquid nitrogen bath for long periods of time to reach the desired temperature.

Figure 3:
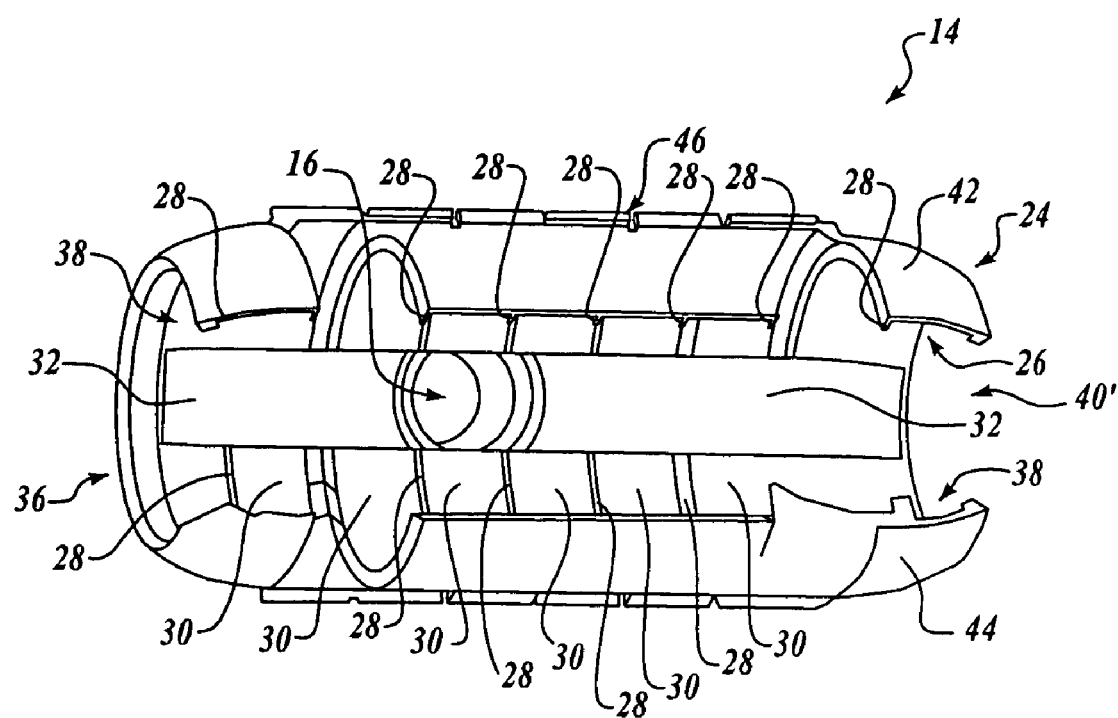
FIG. 3 is a partial cutaway view of an interior of a heat transfer cover according to an embodiment of the present invention.
Figure 4:
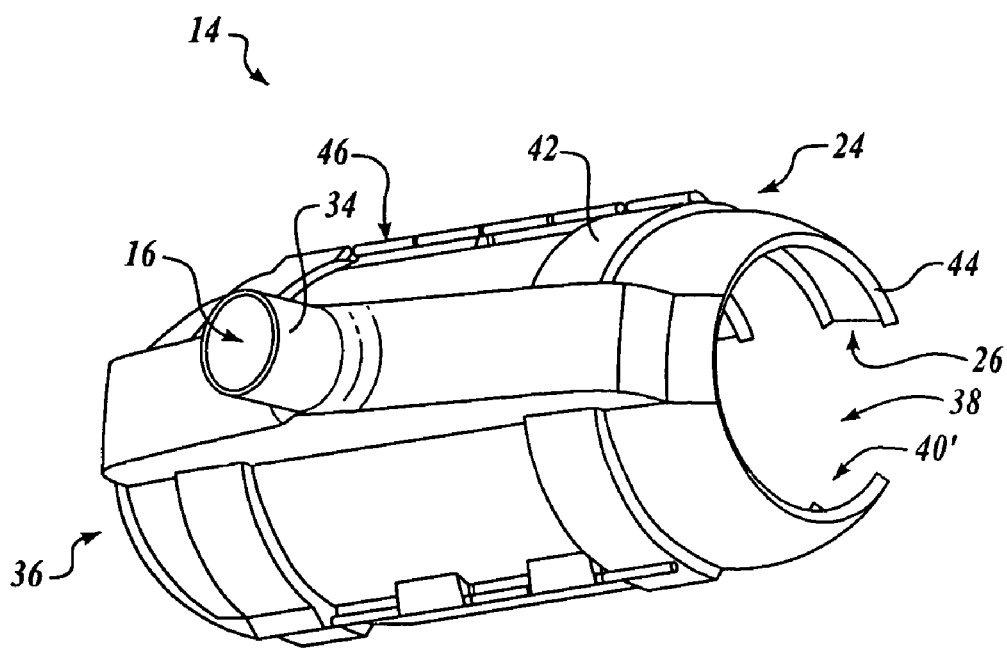
FIG. 4 partial cutaway view of an exterior of a heat transfer cover according to an embodiment of the present invention.

Referring additionally now to FIGS. 3 and 4, the cover body 14 is configured to receive therein the object 12. An exterior 24 of the cover body 14 may have any shape whatsoever. However, it may be desirable for the exterior 24 of the cover body 14 to somewhat resemble a shape of an interior 26 of the cover body 14 in order to increase economic utilization of materials and resources used for the cover body 14.

The interior 26 defines a surface that substantially conforms to a shape of an exterior of the object 12. This feature enables the cover body 14 to snugly fit around and engage the exterior of the object 12. In one embodiment of the present invention that will be discussed in detail further below, the cover 10 is fabricated utilizing a rapid prototyping technique, such as selective laser sintering (SLS), using a computer-generated model that is based on external geometry of the object 12. This fabrication technique advantageously permits the cover body 14 to be fabricated such that the interior 26 exhibits a close-tolerance fit to the object 12.

The interior 26 incorporates means for engaging an exterior of the object 12. For example, in one presently preferred embodiment the interior 26 defines lands 28. Given by way of non-limiting example, the lands 28 suitably extend substantially perpendicular from a surface of the interior 26. The lands 28 suitably are parallel to each other. When the interior 26 defines a substantially cylindrical shape, the lands 28 suitably extend radially or latitudinally (as opposed to axially or longitudinally) about the interior 26. This orientation for the lands 28 facilitates flow of the heat transfer fluid over the exterior of the object 12. However, any orientation for the lands 28 may be chosen as desired for a particular application. For example, in another embodiment the lands 28 suitably extend axially or longitudinally (as opposed to radially or latitudinally) about the interior 26.

The interior 26 also incorporates means for transporting the heat transfer fluid in thermal communication with the object 12. For example, in one presently preferred embodiment of the present invention, the interior 26 defines heat transfer channels 30. Given by way of non-limiting example, two adjacent lands 28 define a heat transfer channel 30 therebetween. The heat transfer fluid flows through the channels 30 in thermal communication with the exterior of the object 12. Thermal energy (in the form of heat) is transferred between the object 12 and the heat transfer fluid flowing through the channels 30, thereby mitigating temperature changes in the object 12.

The interior 26 incorporates means for distributing the heat transfer fluid from the inlet port 16 to the channels 30. For example, in one presently preferred embodiment of the present invention, the interior 26 defines a plenum 32. Given by way of non-limiting example, the plenum 32 is defined within the interior 26 and extends from the inlet port 16. The plenum extends substantially axially or longitudinally substantially a length of the interior 26. The plenum 32 thus connects the channels 30 to the inlet port 16, thereby evenly distributing the heat transfer fluid from the inlet port 16 to the channels 30.

The inlet port 16 includes a riser 34. The riser 34 suitably is any throat-like section that extends substantially perpendicularly out from the exterior 24 of the cover body 14. The riser 34 is configured in any manner desired to connect the inlet port 16 to a source of heat transfer fluid. Given by way of non-limiting example, the riser 34 may be a pipe-like section with smooth walls, a pipe-like section with threaded walls, a quick-disconnect fitting, or the like.

In an exemplary embodiment, the cover body 14 has an end 36 that defines an opening 38. The cover body 14 is sealed against the object 12 at the opening 38. The opening 38 permits accommodation of the test rig (not shown) and the fitting 20. The seal prevents the heat transfer fluid from escaping the interior 26 of the cover body 14. The seal also prevents the flow of the heat transfer fluid from interfering with proper functioning of any test instrumentation, such as thermocouples, that may be included in the test rig (not shown). As shown in FIGS. 1 and 2, an end 40 of the cover body 14 suitably is closed when the object 12 includes no test rigs, fittings 20, instrumentation, or other protrusions. However, as shown in FIGS. 3 and 4, an end 40' of the cover body 14 suitably also defines an opening 38. In this case, it is desirable to define the opening 38 at the end 40' to accommodate protrusions from the object (not shown in FIGS. 3 and 4).

In order to enhance ease of placing the object 12 in the cover body 14, the cover body 14 may be made of more than one piece. Given by way of non-limiting example, the cover body 14 includes cover body members 42 and 44. The cover body members 42 and 44 suitably are hingedly attached to each other with a hinge 46, such as a piano hinge or the like. The cover body members 42 and 44 are opened about the hinge 46, and the object 12 is received therein. With the object 12 recceived in the cover body 14, the cover body members 42 and 44 are rotated closed about the hinge 46. The cover body 14 is sealed against the object 12 at the opening(s) 38. The cover body 14 is closed with a suitable closure 48 (FIG. 2) as desired for a particular application. For example, the closure 48 may be a hook-and-loop closure such as VELCRO™ or any closure as desired.

The heat transfer fluid may be selected as desired for a particular application. For example, in one presently preferred embodiment the heat transfer fluid is ambient air. It will be appreciated that other ambient fluids may be used in place of air, such as without limitation inert gases like $N_2$ gas. Regardless of the gaseous fluid chosen, for the sake of clarity and brevity the gaseous fluid is referred to herein as "air". If desired for a particular application, the cover I 0 may be fabricated to form a closed loop system so that many other heat transfer fluids may be used, such as water or other liquids, such as ammonia or Freon, which have high thermal transfer properties.

Advantageously, when temperature of the object 12 is raised to greater-than-ambient, heat is transferred from the object 12 to the ambient air flowing through the channels 30. As a result, temperature of the object 12 is lowered, thereby mitigating the temperature rise in the object 12. Just as advantageously, when temperature of the object 12 is lowered to less-than-ambient, heat is transferred from the ambient air flowing through the channels 30 to the object 12. As a result, temperature of the object 12 is raised, thereby mitigating the temperature drop in the object 12. Mitigating the temperature excursion advantageously reduces thermal stresses induced in the object 12.

For many applications, the heat transfer capacity of ambient air is sufficient to mitigate expected temperature excursions in the object 12. Thus, one source of heat transfer fluid can provide temperature mitigation. Therefore, production or testing processes are not interrupted to change between one source of heat transfer fluid to cool the object 12 and another source of heat transfer fluid to heat the object 12. In one embodiment of the present invention, time for one pressurization/depressurization cycle of pressure testing has been determined to be reduced from around one hour to around 15 minutes or so (that is, a reduction in cycle time on the order of around 75 percent). In addition, a reduction in touch labor on the order of around 50 percent has been achieved.

From time to time, the object 12 may experience wide temperature excursions. In these instances, the heat transfer capacity of ambient air may be insufficient to mitigate the temperature excursions in the object 12 to the desired extent. Accordingly, in another embodiment, the heat transfer fluid suitably includes air (or any of the other alternate heat transfer fluids discussed above, all collectively referred to herein as "air") that has greater heat transfer capacity than ambient air. For example, when the temperature of the object 12 has been raised from its original temperature (such as during a pressurization portion of a pressure test), the heat transfer fluid may include air at a temperature lower than ambient, such as air supplied by an air conditioner, an air handling unit, a heat pump, or the like. Alternately, when the temperature of the object 12 has been lowered from its original temperature (such as during a depressurization portion of a pressure test), the heat transfer fluid may include air at a temperature greater than ambient, such as air supplied by a heater or the like.

Figure 5:
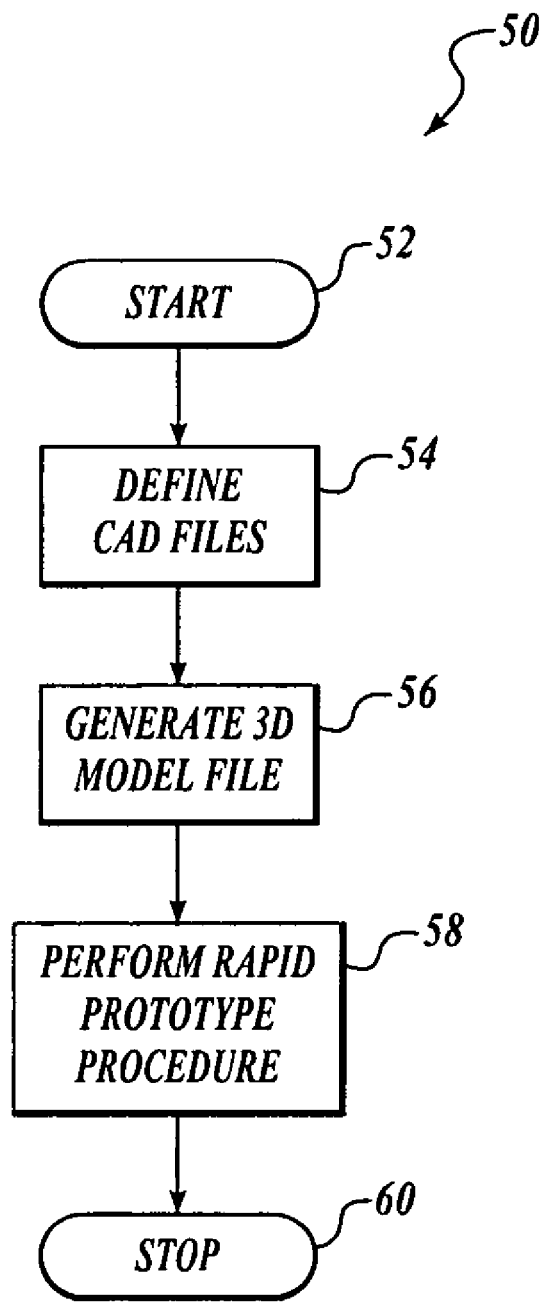
FIG. 5 is a flow chart of a method for fabricating a heat transfer cover according to an embodiment of the present invention.

The cover 10 advantageously may be fabricated with sufficient adherence to design details to permit a close fit with the object 12 received therein. In addition, such a detailed fabrication can be accomplished economically and expeditiously using rapid prototyping techniques. Referring now to FIG. 5, in one exemplary embodiment the cover 10 is fabricated according to a routine 50. The routine 50 begins at a block 52. At a block 54, the cover 10 is defined in a three-dimensional computer-aided-design (CAD) file. The CAD file of the cover 10 is based on the exterior of the object 12. The CAD file includes instructions defining the heat transfer channels 30 and any other feature of the cover 10, as desired for a particular application. Suitable CAD programs for defining the cover 10 include Catia, Pro-E, Autocad, and the like.

At a block 56, a three-dimensional model file is developed from the three-dimensional CAD file. The three-dimensional model file is translated into a sterolithography (STL) file format. Numerous suitable software applications have the ability to create three-dimensional models of hardware along with the ability to translate the information to an STL file format.

At a block 58, the three-dimensional model file is input into a rapid prototyping process. Given by way of non-limiting example, in one presently preferred embodiment the rapid prototyping process is selective laser sintering (SLS). In this exemplary embodiment, the three-dimensional model file is input into a suitable SLS machine, such as a Sinterstation™ 2000 System, a Vanguard™ SLS station, or a Vanguard™ HS (High Speed) SLS station, all available from 3D Systems, Inc., of Valencia, Calif.

According to known SLS fabrication processing, a layer of powdered thermoplastic material (such as nylon, fine nylon, polycarbonate, investment casting wax, or a combination of polymer and binder commercially available under the name TrueForm™) is spread by a roller over a surface of a fabrication piston. The fabrication piston moves down one object layer thickness to accommodate a new layer of powder. According to instructions derived from the three-dimensional model file, a laser beam (such as a beam from a $CO_2$ laser) is traced over the surface of the tightly-compacted powder in a fabrication chamber to selectively melt and bond the powder to form a layer of the cover 10. The fabrication chamber is maintained at a temperature just below the melting point of the powder so that heat from the laser need only elevate the temperature slightly to cause sintering (that is, heating and fusing). The process is repeated until the entire cover 10 is fabricated. After the cover 10 is fully formed, the fabrication piston is raised to elevate the cover 10. Excess powder is brushed away. Final manual finishing may be performed, as desired. For example, the cover 10 is porous because it is sintered. Therefore, it may be desirable to sand. anneal, coat, or paint the cover 10.

Other rapid prototyping processes may be used as desired at the block 58. For example, a stereo lithography (SLA) process may be performed at the block 58. An SLA process may be performed at the block 58 when the cover 10 has a complex shape or geometry. As is known, SLA processing successively cures cross sections of resin with a laser. An ultraviolet laser contacts the resin, that is a photopolymer such as epoxy resin and Exactomer™ resin, to cause the resin to solidify.

After the cover 10 is fabricated and post-processed, if desired, the routine 50 ends at a block 60.

Alternately, the cover 10 may be machined out of any suitable metal, such as aluminum, an aluminum alloy, or the like. Further, if desired the cover 10 may be cast or fabricated out of sheet metal.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A heat transfer cover for mitigating temperature changes of an object, the cover comprising:
   a cover body configured to receive therein at least a portion of an object, an interior of the cover body arranged to cooperate with an exterior of an object received therein to define a plurality of heat transfer channels that are arranged to flow a gaseous heat transfer fluid therethrough and over the exterior of the object; and
   an inlet port configured to connect the plurality of channels with a source of the gaseous heat transfer fluid.

2. The cover of claim 1, wherein the interior of the cover body substantially conforms to a shape of an exterior of the object received therein.

3. The cover of claim 1, further comprising a plenum arranged to distribute the gaseous heat transfer fluid from the inlet port to the plurality of heat transfer channels.

4. The cover of claim 1, wherein the interior of the cover body further defines a plurality of lands that are arranged to engage the exterior of the object.

5. The cover of claim 4, wherein a heat transfer channel is defined between adjacent lands.

6. The cover of claim 1, wherein the cover body includes at least a first end that defines an opening.

7. The cover of claim 6, wherein the at least first end of the cover body and the object are substantially sealed at the opening.

8. The cover of claim 1, wherein the cover body includes first and second cover body members.

9. The cover of claim 8, wherein the first and second cover body members are hingedly attachable to each other.

10. The cover of claim 1, wherein the gaseous heat transfer fluid includes ambient air.

11. The cover of claim 1, wherein the gaseous heat transfer fluid includes at least one of:
   air having a temperature less than ambient when a temperature of the object is higher than an original temperature of the object; and
   air having a temperature greater than ambient when a temperature of the object is lower than an original temperature of the object.

12. A heat transfer cover for mitigating temperature changes of an object, the cover comprising:
   a cover body configured to receive therein at least a portion of an object, an interior of the cover body substantially conforming to a shape of an exterior of an object received therein, the interior of the cover body defining a plurality of lands that are arranged to engage the exterior of the object, the interior of the cover body further arranged to cooperate with an exterior of an object received therein to define a plurality of heat transfer channels that are arranged to flow a gaseous heat transfer fluid therethrouah and over the exterior of the object;
   an inlet port configured to connect to a source of the gaseous heat transfer fluid; and
   a plenum arranged to distribute the gaseous heat transfer fluid from the inlet port to the plurality of heat transfer channels.

13. The cover of claim 12, wherein the cover body includes at least a first end that defines an opening.

14. The cover of claim 13, wherein the at least first end of the cover body and the object are substantially sealed at the opening.

15. The cover of claim 12, wherein the cover body includes first arid second cover body members.

16. The cover of claim 15, wherein the first and second cover body members are hingedly attachable to each other.

17. The cover of claim 12, wherein the gaseous heat transfer fluid includes ambient air.

18. The cover of claim 12, wherein the gaseous heat transfer fluid includes at least one of:
   air having a temperature less than ambient when a temperature of the object is higher than an original temperature of the object; and air having a temperature greater than ambient when a temperature of the object is lower than an original temperature of the object.

19. A method of mitigating temperature changes in an object, the method comprising:
receiving at least a portion of an object in a cover body;
causing temperature of the object to change; and
flowing a gaseous heat transfer fluid through a plurality of heat transfer channels defined by an interior of the cover body and an exterior of an object received therein such that the gaseous heat transfer fluid flows over an exterior of the object.

20. The method of claim 19, wherein the gaseous heat transfer fluid includes ambient air.

21. The method of claim 19, wherein:
causing temperature of the object to change raises temperature of the object; and
flowing the gaseous heat transfer fluid causes heat to be transferred from the object to the gaseous heat transfer fluid.

22. The method of claim 21, wherein causing temperature of the object to change includes raising pressure of the object.

23. The method of claim 21, wherein the gaseous heat transfer fluid includes air having a temperature less than ambient.

24. The method of claim 19, wherein:
causing temperature of the object to change lowers temperature of the object; and
flowing the gaseous heat transfer fluid causes heat to be transferred from the gaseous heat transfer fluid to the object.

25. The method of claim 24, wherein causing temperature of the object to change includes lowering pressure of the object.

26. The method of claim 24, wherein the gaseous heat transfer fluid includes air having a temperature greater than ambient.

27. A heat transfer cover for mitigating temperature changes man object, the heat transfer cover being made according to a process comprising:
based on a shape of an exterior of an object, defining in a computer-aided-design file a cover for the object, an interior of the cover arranged to cooperate with an exterior of an object received therein to define a plurality of heat transfer channels that are arranged to flow a gaseous heat transfer fluid therethrough and over an exterior of the object;
generating a three-dimensional model file from the computer-aided-design file; and
from the three-dimensional model file, performing a rapid prototyping procedure to create the cover.

28. The cover of claim 27, wherein the rapid prototyping procedure includes selective laser sintering.

29. The cover of claim 28, wherein the cover is made from one of composite nylon, fine nylon, polycarbonate, investment casting wax, and a combination of polymer and binder.

30. The cover of claim 27, wherein the rapid prototyping procedure includes stereo lithography.

31. The cover of claim 30, wherein the cover is made from one of epoxy resin and Exactomer resin.

* * * * *